United States Patent
Brickell et al.

(10) Patent No.: US 10,685,349 B2
(45) Date of Patent: Jun. 16, 2020

(54) CONFIRMING PHYSICAL POSSESSION OF PLASTIC NFC CARDS WITH A MOBILE DIGITAL WALLET APPLICATION

(71) Applicant: Google LLC, Mountain View, CA (US)

(72) Inventors: Justin Lee Brickell, San Francisco, CA (US); Max Christoff, Berkeley, CA (US)

(73) Assignee: Google LLC, Mountain View, CA (US)

( * ) Notice: Subject to any disclaimer, the term of this patent is extended or adjusted under 35 U.S.C. 154(b) by 1006 days.

(21) Appl. No.: 14/662,210

(22) Filed: Mar. 18, 2015

(65) Prior Publication Data

US 2016/0275492 A1    Sep. 22, 2016

(51) Int. Cl.
| | |
|---|---|
| *G06Q 20/36* | (2012.01) |
| *G06Q 20/38* | (2012.01) |
| *G06Q 20/34* | (2012.01) |
| *G06Q 20/32* | (2012.01) |
| *G06Q 20/12* | (2012.01) |

(52) U.S. Cl.
CPC ......... *G06Q 20/3674* (2013.01); *G06Q 20/12* (2013.01); *G06Q 20/327* (2013.01); *G06Q 20/341* (2013.01); *G06Q 20/36* (2013.01); *G06Q 20/385* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 8,296,240 B2 * | 10/2012 | Read | G06F 21/10 705/51 |
| 8,396,809 B1 * | 3/2013 | Raff | G06Q 20/3674 705/65 |
| 8,930,274 B1 * | 1/2015 | Brickell | G06F 21/45 705/44 |
| 2002/0169966 A1 * | 11/2002 | Nyman | H04L 63/0407 713/182 |
| 2003/0012382 A1 * | 1/2003 | Ferchichi | H04L 63/062 380/270 |

(Continued)

OTHER PUBLICATIONS

Dass Rajanish, R. M. (2011). Security Framework for addressing the issues of Trust on Mobile Financial (Year: 2011).*

*Primary Examiner* — El Mehdi Oussir
(74) *Attorney, Agent, or Firm* — Dority & Manning, PA

(57) ABSTRACT

A user accesses a merchant system website via a user computing device, selects items for purchase, and selects an option to checkout using a digital wallet account. The user selects payment information associated with a payment card device for use in an online transaction. The merchant system transmits an unpredictable number to the user computing device. The user taps the payment card device to the user computing device to establish a wireless communication channel over which the payment card device receives the unpredictable number. The payment card device transmits payment card information and a check sum calculated from the unpredictable number and by the payment card device to the merchant system via the user computing device. The merchant system transmits the check sum and payment card information in a transaction authorization request to the issuer system, which verifies the check sum using the shared secret and the unpredictable number.

11 Claims, 8 Drawing Sheets

(56) References Cited

U.S. PATENT DOCUMENTS

| | | | | |
|---|---|---|---|---|
| 2004/0078571 A1* | 4/2004 | Haverinen | ............ | H04L 9/0869 713/168 |
| 2005/0102519 A1* | 5/2005 | Morper | ............... | H04L 12/2856 713/170 |
| 2008/0056544 A1* | 3/2008 | Aikawa | ............... | G06K 9/00885 382/124 |
| 2009/0063345 A1* | 3/2009 | Erikson | ................. | G06Q 20/10 705/44 |
| 2009/0292641 A1* | 11/2009 | Weiss | ..................... | G06F 21/32 705/66 |
| 2010/0114776 A1* | 5/2010 | Weller | .................... | G06F 21/31 705/44 |
| 2010/0185545 A1* | 7/2010 | Royyuru | ............... | G06Q 20/04 705/67 |
| 2012/0173348 A1* | 7/2012 | Yoo | ........................ | G06Q 20/10 705/16 |
| 2012/0221421 A1* | 8/2012 | Hammad | ............... | G06Q 10/00 705/16 |
| 2012/0276868 A1* | 11/2012 | Martell | ............... | H04L 12/1453 455/406 |
| 2012/0284193 A1* | 11/2012 | Bharghavan | ......... | H04L 9/3263 705/64 |
| 2013/0226800 A1* | 8/2013 | Patel | .................. | G06Q 20/3224 705/44 |
| 2013/0246199 A1* | 9/2013 | Carlson | ................. | G06Q 20/20 705/16 |
| 2013/0282502 A1* | 10/2013 | Jooste | ................ | G06Q 20/3278 705/21 |
| 2014/0040139 A1* | 2/2014 | Brudnicki | ............ | G06Q 20/227 705/44 |
| 2014/0195425 A1* | 7/2014 | Campos | ................. | G06Q 20/20 705/41 |
| 2014/0279458 A1* | 9/2014 | Holman | ................ | G06Q 20/227 705/40 |
| 2015/0032627 A1* | 1/2015 | Dill | ....................... | G06Q 20/385 705/44 |
| 2015/0046339 A1* | 2/2015 | Wong | ................... | G06Q 20/382 705/71 |
| 2015/0106216 A1* | 4/2015 | Kenderov | .......... | G06Q 20/4014 705/21 |
| 2015/0134540 A1* | 5/2015 | Law | ..................... | G06Q 20/351 705/72 |
| 2015/0220917 A1* | 8/2015 | Aabye | .................. | H04L 9/3268 705/64 |
| 2015/0220925 A1* | 8/2015 | Brickell | ................. | G06Q 20/36 705/41 |
| 2015/0373762 A1* | 12/2015 | Raj | ......................... | H04L 67/12 370/329 |
| 2016/0005023 A1* | 1/2016 | Soundararajan | ... | G06Q 20/4014 705/39 |
| 2016/0012426 A1* | 1/2016 | Chitilian | ............ | G06Q 20/4097 705/44 |
| 2016/0012465 A1* | 1/2016 | Sharp | ..................... | G06Q 20/18 705/14.17 |
| 2016/0092872 A1* | 3/2016 | Prakash | ............. | G06Q 20/3829 705/65 |
| 2016/0110709 A1* | 4/2016 | Lacoss-Arnold | ...... | G06Q 20/02 705/75 |
| 2016/0125396 A1* | 5/2016 | Brickell | ............... | G06Q 20/367 705/67 |

* cited by examiner

CONFIRMING PHYSICAL POSSESSION OF PLASTIC NFC CARDS WITH A MOBILE DIGITAL WALLET APPLICATION

TECHNICAL FIELD

The present disclosure relates to improving the security of online transactions between a merchant system and a user computing device.

BACKGROUND

When users make "in-app" online purchases using a credit card via an application operating on a user computing device, a merchant system associated with the application is charged a "card-not-present" rate because the physical credit card is not presented to the merchant system. Similarly, purchases initiated via a user computing device with a web site are charged card-not-present rates. In addition to incurring higher costs, card-not-present transactions are associated with greater fraud rates than card-present transactions. A user computing device comprising a digital wallet application in which a first user's financial account information is stored may be stolen by a second user. The second user may attempt an online transaction using the first user's financial account stored on the digital wallet of the first user's user computing device. Additionally, a second user may copy a first user's financial account information and attempt to conduct a transaction using the second user's own user computing device by manually entering the first user's stolen financial account information into a merchant system website.

Payment card issuers may desire to verify that a payment card device is in the physical possession of the account holder at the time of an online transaction involving the payment card data. Some verification procedures require that a user log in to a web site of the payment card issuer and enter a code that the user received with the payment card. However, such a process may be cumbersome and deter users from initiating or completing a transaction with the payment card information.

SUMMARY

Techniques herein provide computer-implemented methods to verify user possession of a payment card device during an online transaction. In an example embodiment, an issuer system manufactures a payment card comprising a shared secret for distribution to a user. The user establishes a digital wallet account with an account management system and adds payment information associated with the payment card device. The user accesses a merchant system website via a user computing device, selects one or more items for purchase, and selects an option to checkout using the digital wallet account on the merchant system website. The user selects, from a digital wallet application operating on the user computing device, the payment information associated with the payment card device for use in an online transaction with the merchant system. The merchant system generates an unpredictable number for the payment card device and communicates the unpredictable number to the user computing device. The user taps the payment card device to the user computing device to establish a wireless communication channel. The user computing device transmits the unpredictable number to the payment card device via the wireless communication channel. An application resident on the payment card calculates a cryptographic check sum based on the unpredictable number and the shared secret and communicates the check sum and payment card information to the user computing device, which communicates the check sum, payment card information, and a user computing device identifier to the merchant system via the account management system. The merchant system transmits the check sum and the payment card information to the issuer system in a transaction authorization request. The issuer system verifies the check sum using the shared secret and the unpredictable number associated with the payment card information. The issuer system approves the transaction authorization request and notifies the merchant system of the approval of the transaction authorization request. The merchant system transmits a receipt to the user computing device to display to the user.

In certain other example aspects described herein, systems and computer program products to verify user possession of a payment card device during an online transaction are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
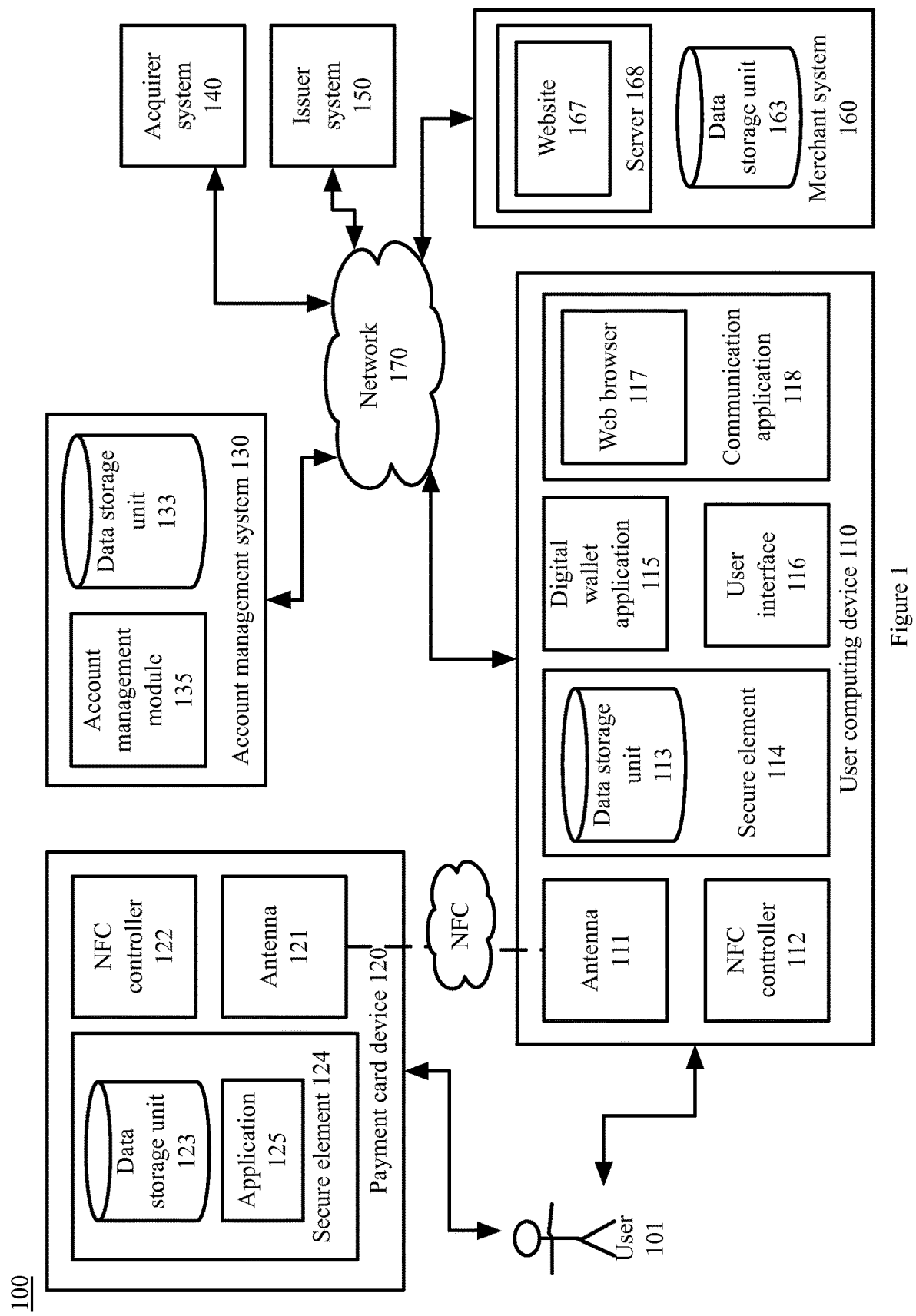
FIG. 1 is a block diagram depicting a system for verifying user possession of a payment card device during an online transaction, in accordance with certain example embodiments.

The example embodiments described herein provide computer-implemented techniques for verifying user possession of a payment card device during an online transaction.

In an example embodiment, an issuer system manufactures, or causes to be manufactured, a payment card comprising a shared secret stored in the payment card for distribution to a user. The user establishes a digital wallet account with an account management system and adds payment information associated with the payment card device to the user's 101 digital wallet account. The user accesses a merchant system website via a user computing device, selects one or more items for purchase, and selects an option to checkout using the digital wallet account on the merchant system website. The user selects, from a digital wallet application operating on the user computing device, the payment information associated with the payment card device for use in an online transaction with the merchant system. The merchant system generates an unpredictable number for the payment card device and communicates the unpredictable number to the user computing device. The user taps the payment card device to the user computing device to establish a wireless communication channel between the payment card device and the user computing device. The user computing device transmits the unpredictable number to the payment card device. An application resident on the payment card calculates a cryptographic check sum based on the unpredictable number and the shared secret and communicates the check sum and payment card information to the user computing device, which communicates the check sum and payment card information to the merchant system via the account management system. The merchant system transmits the check sum and the payment card information to the issuer system in a transaction authorization request. The issuer system verifies the check sum using the shared secret and the unpredictable number associated with the payment card information. The issuer system approves the transaction authorization request and notifies the merchant system of the approval of the transaction authorization request. The merchant system transmits a receipt to the user computing device to display to the user.

In an example embodiment, the issuer system receives a request to generate a payment card for a user. In an example, the user applies for a credit card with the issuer system or an acquirer system associated with the issuer system. The issuer system generates financial account information and a payment card is manufactured. For example, the issuer system creates a user account associated with the user applying for the payment card and creates an account number associated with the user account. In another example embodiment, the issuer system retrieves financial account information associated with the user and manufactures a payment card for the user. For example, the user lost a payment card and requests a replacement payment card from the issuer system.

In the example embodiments described herein, the issuer system generates a shared secret and stores the shared secret on the payment card device or otherwise arranges for the shared secret to be stored on the payment card device. An example payment card device comprises a plastic payment card comprising an application capable of communicating with a user computing device via a wireless communication channel, for example, a near field communication ("NFC") channel, a Bluetooth communication channel, or a Wi-Fi communication channel. In an example embodiment, the example payment card device comprises a secure memory or a secure element that stores the payment card information associated with the user account. The user receives the payment card device. For example, the issuer system mails the payment card device to an address provided by the user in the user's application for a payment card.

In an example embodiment, the user establishes a digital wallet account with a account management system. For example, the user accesses a website, via a user computing device, associated with the account management system and establishes the digital wallet account. The user downloads a digital wallet application onto the user computing device. In the example embodiments described herein, the digital wallet application resident on the user computing device communicates with the account management system via a network. The user may use the digital wallet account and/or digital wallet application resident on the user computing device to store payment information associated with one or more payment card devices. In an example embodiment, the user adds payment information associated with the payment card device to the digital wallet account via the digital wallet application.

In an example embodiment, the user conducts an online transaction with a merchant system using the digital wallet account. For example, the user accesses a merchant system website using the user computing device, selects one or more items for purchase, and selects an option to check out using the user's digital wallet account. The digital wallet application displays a request for the user to select payment card information and the user selects the payment card information associated with the payment card device and initiates a transaction. In an example embodiment, the account management system requests the merchant system to generate an unpredictable number. In an example embodiment, the merchant system generates the unpredictable number and transmits the unpredictable number to the account management system, which transmits the unpredictable number to the user computing device. The digital wallet application operating on the user computing device displays an instruction to the user to tap the payment card device to the user computing device. In an example embodiment, the user taps the payment card device to the user computing device and a near field communication ("NFC") channel is established between the payment card device and the user computing device. For example, a controller resident on the user computing device may instruct an antenna resident on the user computing device to output a radio signal or listen for radio signals. In this example, a controller on the payment card device may instruct an antenna resident on the payment card device to output radio signals or listen for radio signals. Either the user computing device or the payment card device detects the proximity of the other device and the two devices establish an NFC communication channel over which data may be communicated between the two devices. In another example embodiment, another type of communication channel is established, such as a Bluetooth communication channel or a Wi-Fi communication channel.

In an example embodiment, the digital wallet application resident on the user computing device transmits the unpredictable number to the payment card device via the wireless communication channel maintained between the user computing device and the payment card device. In an example embodiment, the payment card device receives the unpredictable number and calculates a cryptographic check sum based on the unpredictable number and the shared secret. In an example, the payment card device application retrieves the shared secret from a secure memory or secure element resident on the payment card device. The payment card device transmits the cryptographic check sum to the user computing device via the wireless communication channel. The account management system receives the cryptographic check sum from the user computing device and transmits the check sum to the merchant system along with payment card information.

In an example embodiment, the merchant system generates a transaction authorization request comprising payment information associated with the payment card, the received cryptographic checksum, and the unpredictable number. The issuer system receives the check sum, the payment card information, and the unpredictable number. The issuer system calculates the cryptographic check sum associated with the payment card information using the shared secret and unpredictable number. For example, the issuer system may comprise a database wherein payment card information associated with a payment card device are stored and associated with corresponding shared secrets. In this example, when the issuer system receives the payment card information from the user computing device, the issuer system retrieves the corresponding shared secret. In an example embodiment, the issuer system compares the calculated cryptographic check sum to the cryptographic check sum received from the merchant system in the transaction authorization request.

In an example embodiment, the issuer system approves the transaction authorization request if the check sum calculated by the issuer system matches the check sum generated by the payment card device and received from the merchant system. In another example embodiment, the issuer system declines the transaction authorization request if the check sum calculated by the issuer system is different from the check sum generated by the payment card device and received from the merchant system. In yet another example embodiment, the check sum calculated by the issuer system and the check sum received from the merchant system match, but the issuer system declines the transaction authorization request for other reasons. For example, the user may not have already exceeded his credit limit associated with the payment card account or would exceed the credit limit if the transaction were approved by the issuer system. In an example embodiment, the issuer system transmits a notice of approved or declined transaction authorization request to the merchant system. In an example embodiment, the merchant system transmits a receipt to the user computing device.

By using and relying on the methods and systems described herein, the issuer system, account management system, merchant system, and user computing device enable the issuer system to verify user possession of the payment card device without the user having to undergo separate communication with the issuer system, as required in some current technology. For example, by issuing the payment card device comprising the shared secret to the user and conducting a verification of the checksum, the issuer system is able to verify user possession of the payment card device. For example, the methods and systems described herein do not require the user to access a web site of the issuer system and enter a password or otherwise communicate a verification value communicated out of band to the user from the issuer system. As such, the systems and methods described herein may reduce the inputs required by the user via the user computing device and the processing required by the issuer system to verify user possession of the payment card device. Additionally, by verifying user possession of the payment card device during an online transaction, the transaction may receive "card present" transaction rates, which are less than "card not present" transaction rates, which would provide economic savings to the user.

Example System Architecture

Turning now to the drawings, in which like numerals indicate like (but not necessarily identical) elements throughout the figures, example embodiments are described in detail.

FIG. 1 is a block diagram depicting a system 100 for verifying user possession of a payment card device during an online transaction, in accordance with certain example embodiments. As depicted in FIG. 1, the system 100 includes network computing devices 110, 120, 130, 140, 150, and 160 that are configured to communicate with one another via one or more networks 170. In some embodiments, a user associated with a device must install an application and/or make a feature selection to obtain the benefits of the techniques described herein.

In example embodiments, the network 170 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, 130, 140, 150, and 160 includes a device having a communication module capable of transmitting and receiving data over the network 170. For example, each network computing device 110, 120, 130, 140, 150, and 160 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, 140, 150, and 160 are operated by users 101, users 101, account management system operators, acquirer system operators, issuer system operators, and merchant system operators, respectively.

An example user computing device 110 comprises an antenna 111, an NFC controller 112, a data storage unit 113, a secure element 114, a digital wallet application 115, a user interface 116, a web browser 117, and a communication application.

In an example embodiment, the antenna 111 is a means of communication between the user computing device 110 and a payment card device 120. In an example embodiment, an NFC controller 112 outputs through the antenna 111 a radio signal, or listens for radio signals from the payment card device 120. In another example embodiment a Bluetooth controller or a Wi-Fi controller is used. In an example embodiment, the NFC controller 112 outputs through the antenna 111 a radio signal, or listens for radio signals from the payment card device 120.

In an example embodiment, the NFC controller 112 is capable of sending and receiving data, performing authentication and ciphering functions, and directing how the user computing device 110 will listen for transmissions from the payment card device 120 or configuring the user computing device 110 into various power-save modes according to NFC-specified procedures. In another example embodiment, the user computing device 110 comprises a Bluetooth controller or a Wi-Fi controller capable of performing similar functions. An example NFC controller 112 communicates with the digital wallet application 115 and is capable of sending and receiving data over a wireless, NFC communication channel. In another example embodiment, a Bluetooth controller 112 or Wi-Fi controller 112 performs similar functions as the NFC controller 112 using Bluetooth or Wi-Fi protocols. In an example embodiment, the NFC controller 112 activates the antenna 111 to create a wireless communication channel between the user computing device 110 and the payment card device 120. The user computing device 110 communicates with the payment card device 120 via the antenna 111. In an example embodiment, when the user computing device 110 has been activated, the NFC controller 112 polls through the antenna 111 a radio signal, or listens for radio signals from the payment card device 120.

In an example embodiment, the data storage unit 113 comprises a local or remote data storage structure accessible to the user computing device 110 suitable for storing information. In an example embodiment, the data storage unit 113 stores encrypted information, such as HTML5 local storage. In an example embodiment, the data storage unit 113 resides within a secure element 114.

In an example embodiment, the secure element 114 exists within a removable smart chip or secure digital (SD) card or may be embedded within a fixed chip on the user computing device 110. In certain example embodiments, Subscriber Identity Module (SIM) cards may be capable of hosting a secure element 114, for example, an NFC SIM Card. The secure element 114 allows a digital wallet application 115 or other application resident on the user computing device 110 to interact securely with certain functions within the secure element 114, while protecting information stored within the secured element 114. In an example embodiment, the secure element 114 comprises components typical of a smart card, such as crypto processors and random generators. In an example embodiment, the secure element 114 comprises a Smart MX type NFC controller in a highly secure system on a chip controlled by a smart card operating system, such as a JavaCard Open Platform (JCOP) operating system. In another example embodiment, the secure element 114 is configured to include a non-EMV type contactless smart card, as an optional implementation. The secure element 114 communicates with the digital wallet application 115 in the user device 110. In an example embodiment, the secure element 114 is capable of storing encrypted user information and only allowing trusted applications to access the stored information. In an example embodiment, an NFC controller 112 interacts with a secure key encrypted application for decryption and installation in the secure element 114.

In an example embodiment, the digital wallet application 115 is a program, function, routine, applet, or similar entity that exists on and performs its operations on the user computing device 110. In certain embodiments, the user 101 must install the digital wallet application 115 and/or make a feature selection on the user computing device 110 to obtain the benefits of the techniques described herein. In an example embodiment, the digital wallet application 115 communicates with the account management system 130, which manages the user's 101 digital wallet account. In an example embodiment, the user 101 may access the user's 101 digital wallet account via the digital wallet application 115. In an example embodiment, the user 101 may select an option, via the digital wallet application 115, to add payment card information to the digital wallet account. In an example embodiment, the digital wallet application 115 establishes a wireless communication channel with the payment card device 120 in response to detecting that the user 101 has tapped the payment card device 120 to the user computing device 110.

In an example embodiment, when the user 101 initiates a digital wallet transaction with the merchant system 160 on the merchant system website 167, the digital wallet application 115 displays a request for the user 101 to select payment information from the user's 101 digital wallet account to use in the transaction. In an example embodiment, in response to receiving a user 101 selection of the payment card device 120 for use in the transaction, the digital wallet application 115 communicates the user 101 selection of the payment card device 120 to the account management system 130.

In certain example embodiments described herein, one or more functions performed by the digital wallet application 115 resident on the user computing device 110 may also be performed by a web browser 117 application associated with the account management system 130 or by the account management system 130. In certain example embodiments described herein, one or more functions performed by the account management system 130 may also be performed by the digital wallet application 115. In certain example embodiments described herein, one or more functions performed by the web browser 117 application associated with the account management system 130 may also be performed by the digital wallet application 115.

In certain example embodiments described herein, the digital wallet application 115 maintains periodic or constant communication with the account management system 130 via the network 170. In certain example embodiments, the digital wallet application 115 and is able to send and receive data associated with the user's 101 digital wallet account to and from the account management system 130 when appropriate. For example, the digital wallet application 115 may communicate user 101 interactions with the digital wallet application 115 via the user interface 116 to the account management system 130, such as a user 101 selection of an option to add a payment card device 120 or a user 101 selection of payment card information for use in a transaction with the merchant system 160. In another example, the digital wallet application 115 may receive data associated with the user's 101 digital wallet account from the account management system 130, such as an approval or denial of a transaction authorization request received from the issuer system 150.

In an example embodiment, the user interface 116 may be a touch screen, a voice-based interface or any other interface that allows the user 101 to provide input and receive output from an application or module on the user computing device 110. In an example embodiment, the user interface 116 enables the user 101 to interact with the digital wallet application 115 or a web browser 117 application associated with the account management system 130. For example, the user 101 may actuate one or more objects on the user interface 116 to communicate a selection of an option on the digital wallet application 115 to add payment information to the user's 101 digital wallet account. In another example, the user 101 may actuate one or more objects on the user interface 116 to communicate a selection of payment card data for use in a transaction to the digital wallet application 115. In example embodiment, the user interface 116 enables the user 101 to interact with a merchant system website 167 via the web browser 117. For example, the user 101 may actuate one or more objects on the user interface 116 to communicate a selection of an option add one or more items to a virtual shopping cart, check out, and/or select an option to conduct a digital wallet transaction on the merchant website 167.

In an example embodiment, the user 101 can use a communication application 118, such as a web browser 117 application or a stand-alone application, to view, download, upload, or otherwise access documents or web pages via a distributed network 170.

In an example embodiment, the web browser 117 can enable the user 101 to interact with web pages using the user computing device 110. In an example embodiment, the user 101 may access the user's 101 digital wallet account maintained by the account management system 130 via the web browser 117. In another example embodiment, the user 101 may access the merchant system website 167 via the web browser 117. In certain example embodiments described herein, one or more functions performed by the digital wallet application 115 may also be performed by a web browser 117 application associated with the account management system 130.

In an example embodiment, the communication application 118 can interact with web servers or other computing devices connected to the network 170, including the user computing device 110 and a web server 168 of a merchant system 160.

An example payment card device 120 comprises an antenna 121, an NFC controller 122, a data storage unit 123, a secure element 124, and an application 125.

In an example embodiment, the issuer system 150 produces the payment card device 120 or otherwise orders the production of the payment card device 120. In an example embodiment, the issuer system 150 generates a shared secret and saves the shared secret on the payment card device 120 or otherwise arranges for the shared secret to be saved on the payment card device 120. In an example embodiment, the payment card device 120 is a standard payment card, such as a credit card or a debit card, which conforms to industry customs and standards. For example, the payment card device 120 may comprise an account number, an expiration date, and other standard information written or otherwise engraved on the front or back of the card in addition to a magnetic stripe comprising payment information. In the example embodiments described herein, the payment card device 120 is able to establish a wireless communication channel, such as an NFC communication channel, with a user computing device 110 and send and receive data via the wireless communication channel.

An example NFC controller 122 communicates with the application 125 and is capable of sending and receiving data over a wireless, NFC communication channel. In another example embodiment, the controller 122 is a Bluetooth controller or Wi-Fi controller and is capable of sending and receiving data over the corresponding wireless communication channel. In an example embodiment, the NFC controller 122 activates the antenna 121 to create the wireless communication channel. The payment card device 120 communicates with the user computing device 110 via the antenna 121. In an example embodiment, when the payment card device 120 has been activated, the NFC controller 122 polls through the antenna 121 a radio signal, or listens for radio signals from the user computing device 110.

An example data storage unit 123 comprises a local or remote data storage structure accessible to the payment card device 120 suitable for storing information. In an example embodiment, the data storage unit 123 stores encrypted information, such as HTML5 local storage. In an example embodiment, the data storage unit 123 resides within a secure element 124. In an example embodiment, the data storage unit 123 stores payment card information associated with a user's 101 financial account with the issuer system 150. In an example embodiment, the data storage unit 123 stores a shared secret generated by the issuer system 150.

An example secure element 124 is capable of storing encrypted user information and only allowing trusted applications to access the stored information. In an example embodiment, the shared secret generated by the issuer system 150 and/or the payment card information is stored in the secure element 124. In an example embodiment, the secure element 124 comprises a processor that can perform certain functions, such as calculating a checksum based on a stored shared secret and an unpredictable number generated by a merchant system 160. In this example embodiment, the secure element 124 processor executes the application 125 resident on the secure element 124 to calculate a cryptographic checksum or perform other functions described herein as being performed by the application 125.

An example application 125 is a program, function, routine, applet, or similar entity that exists on and performs its operations on the payment card device 120. In certain embodiments, the issuer system 150 must install the application 125 to obtain the benefits of the techniques described herein. In an example embodiment, the application 125 communicates with the NFC controller 122 to activate the antenna 121 and send and/or receive data via the antenna 121 from the user computing device 110. In an example embodiment, the application 125 extracts payment card data stored on the data storage unit 123 and/or secure element 124 in response to receiving a request for payment card information from the user computing device 110 via the wireless NFC communication channel.

An example account management system 130 comprises a data storage unit 133 and a payment processing module 135.

An example data storage unit 133 comprises a local or remote data storage structure accessible to the account management system 130 suitable for storing information. In an example embodiment, the data storage unit 133 stores encrypted information, such as HTML5 local storage. In an example embodiment, the account management system 130 stores data in data storage unit 133 associated with the user's 101 digital wallet account.

An example payment processing module 135 communicates with the user computing device 110 and the issuer system 150. In an example embodiment, the payment processing module 135 transmits a request for an unpredictable number to the merchant system 160, receives an unpredictable number from the merchant system 160, and transmits the unpredictable number to the user computing device 110. In an example embodiment, the payment processing module 135 generates a transaction authorization request associated with a user 101 initiated online transaction with the merchant system 160. In an example embodiment, the payment processing module 135 transmits the transaction authorization request to the issuer system 150 and receives an approval or denial of the transaction authorization request from the issuer system 150. In an example embodiment, the payment processing module 135 generates a receipt based on the received approval or denial of the transaction authorization request. In another example embodiment, the payment processing module 135 transmits a check sum generated by the payment card device 120 and payment account information associated with the payment card device to the merchant system 160, which generates a transaction authorization request to transmit to the issuer system 150. In certain example embodiments, one or more functions performed by the payment processing module 135 and/or account management system 130 may also be performed by the digital wallet application 115 and/or a web browser 117 application associated with the account management system 130.

An example acquirer system 140 interacts with the merchant system 160 and the issuer system 150 to process the payment. For example, the acquirer is a third party payment processing company. In an example embodiment, the transaction authorization request sent by the merchant system 160 to the issuer system 150 is routed through the acquirer system 140.

An example issuer system 150 maintains a financial account, such as a credit account, associated with the user 101. In an example embodiment, the issuer system 150 produces a payment card device 120 or causes a payment card device 120 to be produced that comprises payment card information associated with the user's 101 financial account. In an example embodiment, the issuer system 150 generates a shared secret that is saved on the payment card device 120. In the example embodiments described herein, the issuer system 150 may communicate with an acquirer system 140, the account management system 130, the user computing device 110, and/or the merchant system 160 via the network 170. In an example embodiment, the issuer system 150 verifies a cryptographic checksum calculated by the payment card device 120 using the shared secret associated with the payment card device 120 and the unpredictable number generated by the merchant system 160.

In an example embodiment, the issuer system 150 receives, from the merchant system 160, a transaction authorization request, a check sum generated by the payment card device 120, and an unpredictable number generated by the merchant system 160. In an example embodiment, the issuer system 150 approves the transaction based on the validity of the received check sum and any other relevant considerations for approving a transaction authorization request. In other example embodiments, the issuer system 150 denies a transaction authorization request. In an example embodiment, the issuer system 150 transmits a notice of approval or denial of the transaction authorization request to the merchant system 160, the account management system 130, and/or the user computing device 110. In an example embodiment, in response to approving the transaction authorization request, the issuer system 150 schedules a payment to a merchant system 160 account for the amount of the user 101 transaction and bills the user 101 for the transaction amount.

An example merchant system 160 comprises a data storage unit 163, a website 167, and a server 168.

An example data storage unit 163 comprises a local or remote data storage structure accessible to the merchant system 160 suitable for storing information. In an example embodiment, the data storage unit 163 stores encrypted information, such as HTML5 local storage.

An example website 167 comprises a merchant system 160 shopping website and allows users 101 to select one or more items for purchase on the website 167 and initiate an online digital wallet transaction with the merchant system 160 using a user's 101 digital wallet account associated with the account management system 130.

An example server 168 provides the content accessible by the user 101 through the web browser 113 or shopping application (not depicted) on the user computing device 110, including but not limited to html documents, images, style sheets, and scripts. In an example embodiment, the server 168 supports the merchant system's 160 website 167.

It will be appreciated that the network connections shown are example and other means of establishing a communications link between the computers and devices can be used. Moreover, those having ordinary skill in the art having the benefit of the present disclosure will appreciate that the user computing device 110, the payment card device 120, the account management system 130, the acquirer system 140, the issuer system 150, and the merchant system 160 illustrated in FIG. 1 can have any of several other suitable computer system configurations. For example, a user computing device 110 embodied as a mobile phone or handheld computer may or may not include all the components described above.

Figure 8:
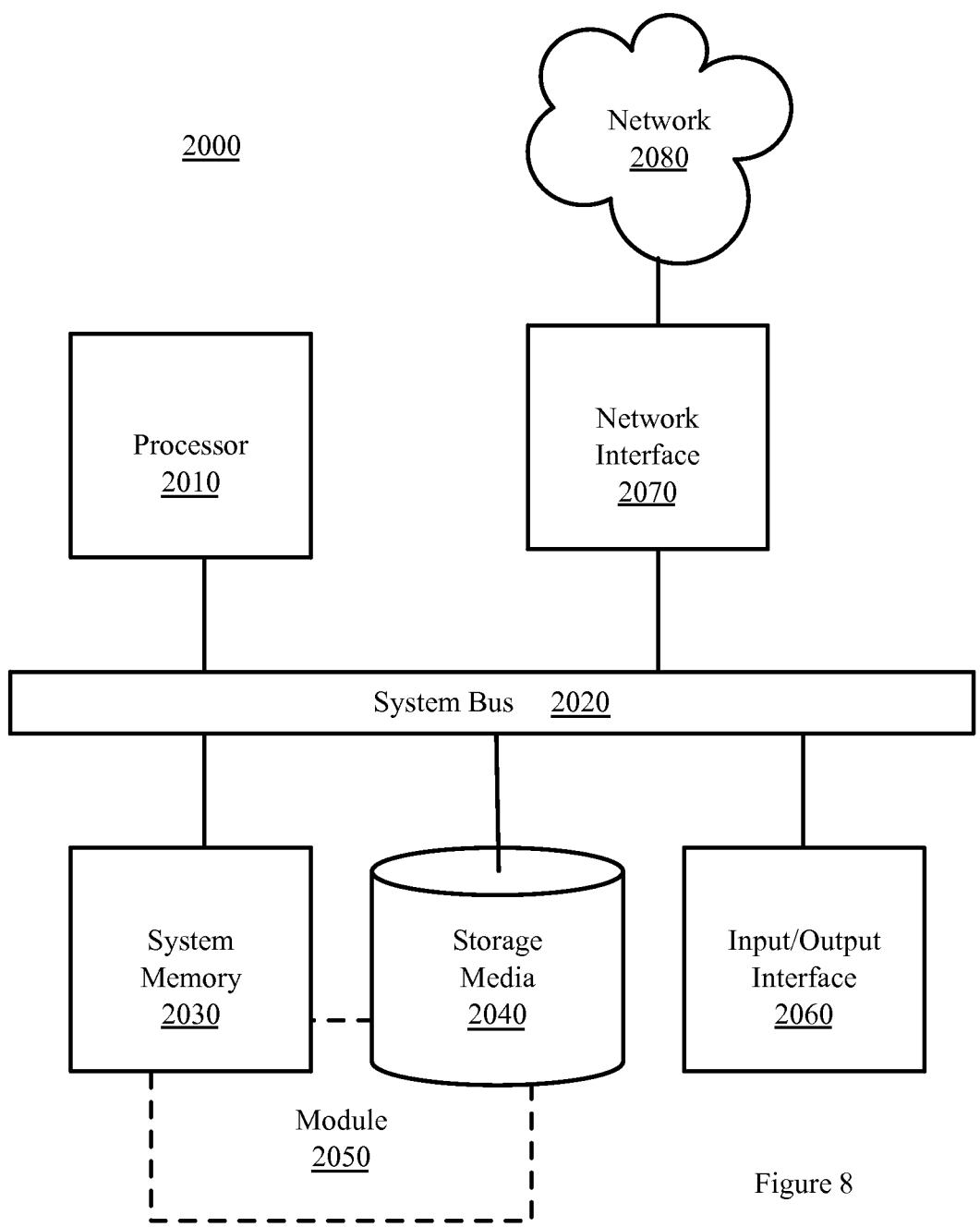
FIG. 8 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may by any of the modules discussed in more detail with respect to FIG. 8. The computing machines discussed herein may communicate with one another as well as other computer machines or communication systems over one or more networks, such as network 170. The network 170 may include any type of data or communications network, including any of the network technology discussed with respect to FIG. 8.

Example Processes

The example methods illustrated in FIGS. 2-7 are described hereinafter with respect to the components of the example operating environment 100. The example methods of FIGS. 2-7 may also be performed with other systems and in other environments.

Figure 2:
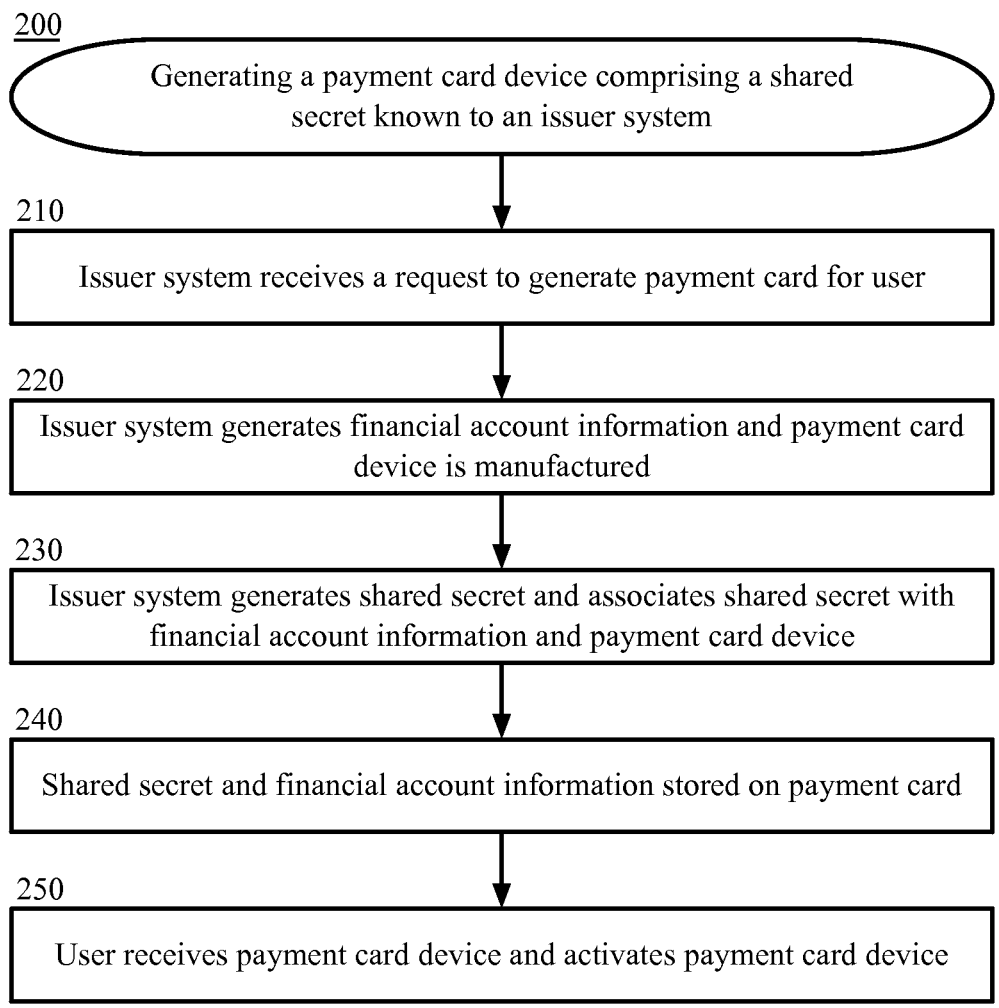
FIG. 2 is a block flow diagram depicting a method for generating a payment card device comprising a shared secret known to an issuer system, in accordance with certain example embodiments.

FIG. 2 is a block diagram depicting a method 200 for generating a payment card device 120 comprising a shared secret known to an issuer system 150, in accordance with certain example embodiments. The method 200 is described with reference to the components illustrated in FIG. 1.

In block 210, the issuer system 150 receives a request to generate a payment card for a user 101. For example, a user 101 applies for a credit card, debit card, or other payment card device 120 with the issuer system 150 or an acquirer system or other system associated with the issuer system 150. For example, the user 101 submits an application for a credit card comprising user 101 demographic data such as the user's 101 name, annual income, annual expenses, estimated amount of debt, address, and any other useful or relevant information related to a credit card application. In another example embodiment, the user 101 already has a financial account associated with the issuer system 150 and the user 101 requests the issuer system 150 to generate a payment card device 120 or replacement payment card device 120 when a user 101 has lost a payment card device 120.

In block 220, the issuer system 150 generates financial account information and a payment card device 120 is manufactured. For example, the issuer system 150 approves the user's 101 application for a payment card device 120 and creates a financial account and payment card device 120 for the user 101. Example financial account information comprises a financial account number. In another example embodiment, the user 101 already has a financial account with the issuer system 150 and the issuer system 150 retrieves the financial account information associated with the user 101. In an example embodiment, the issuer system 150 generates payment card information associated with the manufactured payment card device 120 such as a payment card device 120 number, a card verification value ("CVC"), an expiration date, and/or other necessary information relevant to the user's 101 financial account with the issuer system 150 and/or payment card device 120. In an example embodiment, the issuer system 150 comprises a manufacturing facility and manufactures the payment card device 120. In an example embodiment, the issuer system 150 orders a payment card device 120 to be manufactured by another system.

In block 230, the issuer system 150 generates a shared secret and associates the shared secret with the financial account information and payment card device 130. In an example embodiment, the issuer system 150 comprises a database and stores in the database a record comprising the user's 101 name, financial account number, financial account information, payment card device 120 information, and the shared secret associated with the payment card device 120.

In block 240, the shared secret and financial account information are stored on the payment card device 120. In an example embodiment, the payment card device 120 comprises a secure element 124 or secure memory wherein the financial account information and shared secret are stored. An example shared secret comprises one or more strings of numbers, letters, and/or symbols.

In block 250, the user 101 receives the payment card device 120. In an example embodiment, the user 101 receives the payment card device 120 in the mail along with an approval of the user's 101 application for the payment card device 120.

Figure 3:
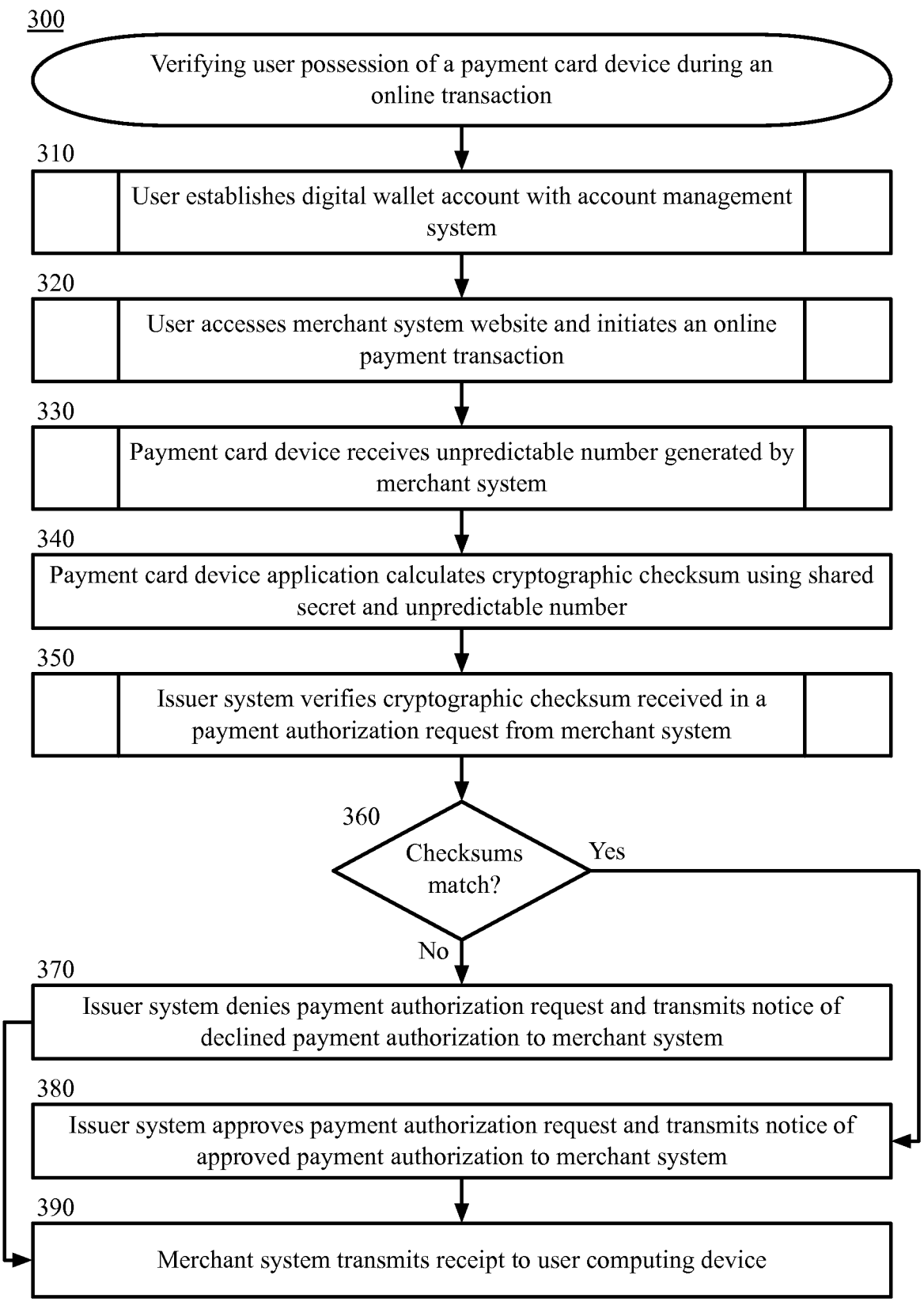
FIG. 3 is a block flow diagram depicting a method for verifying user possession of a payment card device during an online transaction, in accordance with certain example embodiments.

FIG. 3 is a block diagram depicting a method 300 for verifying user 101 possession of a payment card device 120 during an online transaction, in accordance with certain example embodiments. The method 300 is described with reference to the components illustrated in FIG. 1.

In block 310, the user 101 establishes a digital wallet account with the account management system 130. The method for establishing a digital wallet account with the account management system 130 is described in more detail hereinafter with reference to the method described in FIG. 4.

Figure 4:
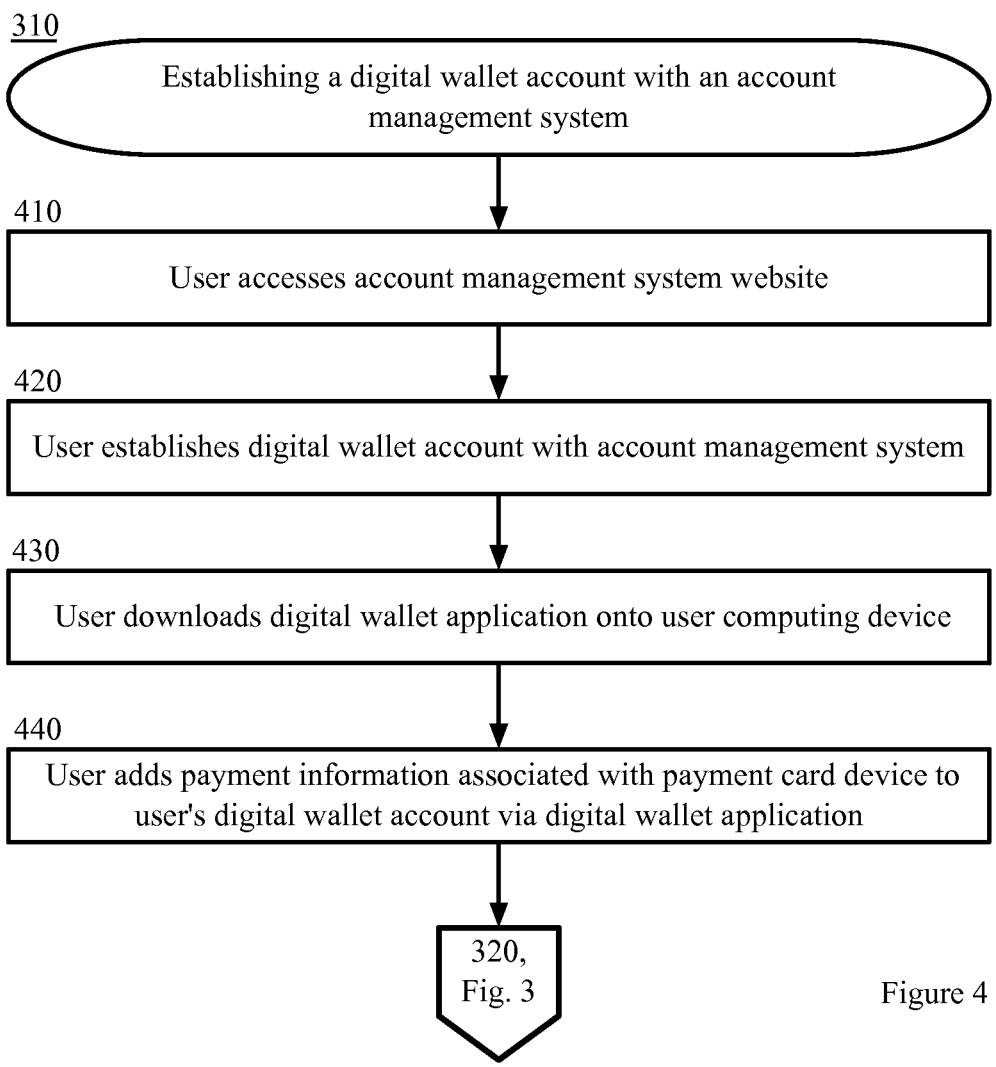
FIG. 4 is a block flow diagram depicting a method for establishing a digital wallet account with an account management system, in accordance with certain example embodiments.

FIG. 4 is a block diagram depicting a method 310 for establishing a digital wallet account with a account management system 130, in accordance with certain example embodiments. The method 310 is described with reference to the components illustrated in FIG. 1.

In block 410, the user 101 accesses a account management system 130 website. In an example embodiment, the user 101 accesses the account management system 130 website (not depicted) via the web browser 117 of the user computing device 110. For example, the user 101 enters the website address in the address bar of the web browser in order to access the website. In another example embodiment, the user 101 accesses the account management system 130 website using an application resident on the user computing device 110. For example, the user 101 selects an application on the user computing device 110 that connects the user 101 to the account management system 130 website.

In block 420, the user 101 establishes a digital wallet account with the account management system 120. In an example embodiment, the user 101 registers a username and a password associated with the user account to use to sign in to the digital wallet account. In an example embodiment, the user account is further associated with an email service, a messaging service, a gaming service, or a mapping service. In another example embodiment, the user account is associated with multiple services in addition to the digital wallet account. In an example embodiment, the user 101 may enter payment account information into the digital wallet account via the user computing device 110. For example, the user 101 may enter payment account information associated with one or more bank accounts, debit cards, credit cards, or other accounts into the digital wallet account using the user computing device 110.

In block 430, the user 101 downloads a digital wallet application 115 onto the user computing device 110. In an example embodiment, the digital wallet application 115 communicates with the account management system 130 over the network 170. In an example embodiment, the digital wallet application 115 is associated with the user 101 account and is operable to allow the user 101 to access the user account and/or services provided by the account management system 130. In another example embodiment, the user 101 may download various applications associated with the user account from the account management system 130. In another example embodiment, the digital wallet application 115 is downloaded on the user computing device 110 before the user 101 establishes the user account with the account management system 130. In certain example embodiments, the user 101 does not download the digital wallet application 115 onto the user computing device 110.

In block 440, the user 101 adds payment information associated with the payment card device 120 to the user's 101 digital wallet account via the digital wallet application 115. In an example embodiment, the user 101 accesses the digital wallet application 115 and selects an option on the digital wallet application 115 to add payment card device 120 information to the user's 101 digital wallet account. In an example embodiment, the digital wallet application 115 requests that the user 101 tap a payment card device 120 that the user 101 wishes to add to the user computing device 110. In an example embodiment, the user 101 taps the payment card device 120 to the user computing device 110. In this example embodiment, a wireless communication channel is established between the payment card device 120 and the user computing device 110. For example, a near-field communication ("NFC"), Wi-Fi, or Bluetooth wireless communication channel is established. In an example embodiment, the digital wallet application 115 operating on the user computing device transmits a request via the wireless communication channel to the payment card device 120 requesting payment account information from the payment card device 120. In an example embodiment, the payment card device 120 receives the request for payment account information and transmits payment account information to the user computing device 110.

In an example embodiment, the payment account information comprises financial account information associated with the payment card device 120. In an example embodiment, the payment account information comprises financial account information and account verification information. In an example embodiment, the financial account information comprises information for a credit account, debit account, bank account, or other form of financial account information. In another example embodiment, the payment account information comprises secure information contained in a secure memory, secure element 124, or secure sub-device of the payment card device 120 that conforms to a standardized protocol (such as a Europay, MasterCard, and VISA (EMV) protocol).

In another example embodiment, the user 101 selects an option on the digital wallet application 115 to manually enter payment account information from the payment card device 120 via the user interface 116. In this example embodiment, the user 101 may enter an account number, an expiration date, a zip code, a name, and/or any other appropriate payment account information associated with the payment card device 120.

From block 440, the method 310 proceeds to block 320 of FIG. 3.

Returning to FIG. 3, in block 320, the user 101 accesses a merchant system website 167 and initiates an online payment transaction. The method for accessing a merchant system website 167 and initiating an online payment transaction is described in more detail hereinafter with reference to the method 320 described in FIG. 5.

Figure 5:
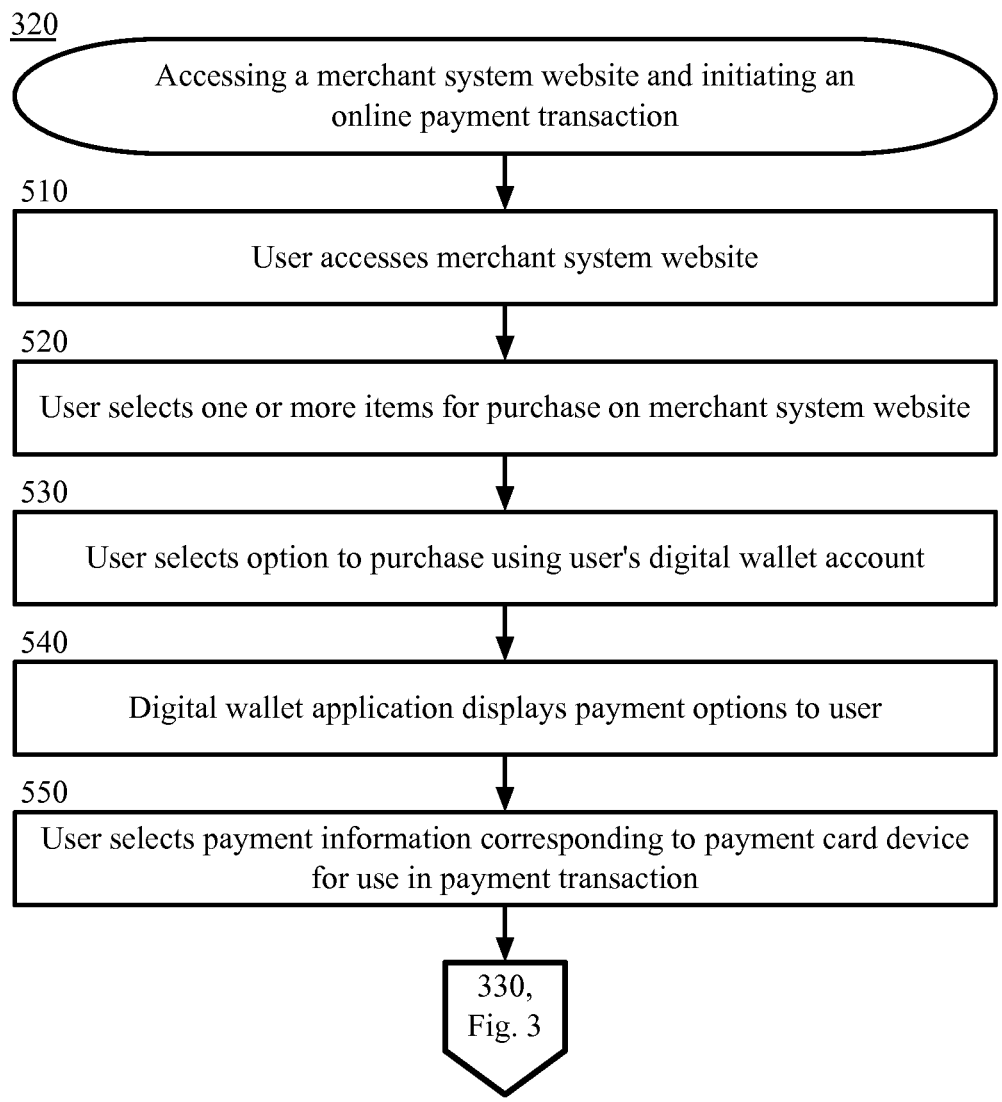
FIG. 5 is a block flow diagram depicting a method for accessing a merchant website and initiating an online transaction, in accordance with certain example embodiments.

FIG. 5 is a block diagram depicting a method 320 for accessing a merchant system website 167 and initiating an online payment transaction, in accordance with certain example embodiments. The method 320 is described with reference to the components illustrated in FIG. 1.

In block 510, the user 101 accesses the merchant system website 167. In an example embodiment, the user 101 enters the merchant website 167 address into the web browser 117 of the user computing device 110 or otherwise accesses the merchant website 167 via the web browser 117. In an example, the user 101 actuates a user interface 116 object for a merchant system 160 advertisement on the web browser 117 and the web browser 117 redirects to the website 167. In another example embodiment, the user 101 accesses the merchant system website 167 via a merchant application (not shown) resident on the user computing device 110 that communicates with the merchant system 160 over the network 170. For example, the user 101 downloads the merchant application from the merchant system 160. An example merchant application may comprise a game application, a shopping application, or any other application that allows the user 101 make online purchases via the merchant application.

In block 520, the user 101 selects one or more items for purchase on the merchant system website 167. For example, the user 101 selects one or more items on the website 167 and selects an option to add the items to a virtual shopping cart on the merchant system website 167.

In block 530, the user 101 selects an option to purchase using the user's 101 digital wallet account. For example, the user 101 actuates a user interface 116 object to select an option to checkout on the website 167. In an example embodiment, the merchant system website 167 displays one or more options for checkout. In this example embodiment, the merchant system website 167 may display an option for the user 101 to check out using the digital wallet account associated with the account management system 130. For example, the merchant system website 167 may display an option to pay via credit card, bank account, or digital wallet application.

In block 540, the digital wallet application 115 displays payment options to the user 101. In an example embodiment, the merchant system website 167 communicates transaction details to the user computing device 110 and/or the account management system 130 over the network 170. For example, transaction details may comprise a total amount of the transaction initiated by the user 101. In another example, the transaction details may further comprise a list of items and corresponding prices in the transaction, a merchant system 160 account number associated with a financial institution, and any other useful or relevant information that the account management system 130 and/or user computing device 110 digital wallet application 115 may use to process the user-initiated transaction. In this example embodiment, the account management system 130 and/or the user computing device 110 receives the transaction details transmitted by the merchant system website 167. For example, the account management system 130 receives the transaction details from the merchant system website 167 over the network 170 and communicates the transaction details to the user computing device 110 via the network 170. In an example embodiment, in response to receiving the transaction details from the merchant system 160, the digital wallet application 115 operating on the user computing device 110 displays one or more payment options of the user's 101 digital wallet account to the user 101 for selection by the user 101. For example, the user's 101 digital wallet account may comprise payment account information associated with one or more credit cards, including payment account information associated with the payment card device 120.

In another example embodiment, the merchant system 160 does not transmit transaction details to the account management system 130 or the user computing device 110. In this example embodiment, the merchant system 160, in response to receiving an indication of a user 101 selection of an option to check out using a digital wallet account on the merchant system website 167, transmits a request for payment account information to the account management system 130. In this example embodiment, in response to receiving the request for payment account information, the account management system 130 instructs the digital wallet application 115 operating on the user computing device 110 to display one or more payment options associated with the user's 101 digital wallet account to the user 101 for selection via the user computing device 110.

In block 550, the user 101 selects payment information corresponding to the payment card device 120 for use in the payment transaction. For example, the user 101 actuates one or more objects on the user interface 116 to select the payment information corresponding to the payment card device 120 on the digital wallet application 115.

In other example embodiments, the user 101 does not select payment information from a digital wallet application 115 for use in the payment transaction. In this example embodiment, the user 101 may select an option on the merchant system website 167 to pay using a payment card. For example the user 101 selects an option to pay using a payment card associated with an issuer system 150 associated with the payment card device 120. In this example embodiment, the merchant system website 167 communicates to the account management system 130 the user's 101 selection to pay via a payment card associated with the issuer system 150.

From block 550, the method 320 proceeds to block 330 in FIG. 3.

Returning to FIG. 3, in block 330, the payment card device 120 receives an unpredictable number generated by the merchant system 160.

The method for receiving, on a payment card device 120, an unpredictable number generated by a merchant system 160 is described in more detail hereinafter with reference to the method 330 described in FIG. 6.

Figure 6:
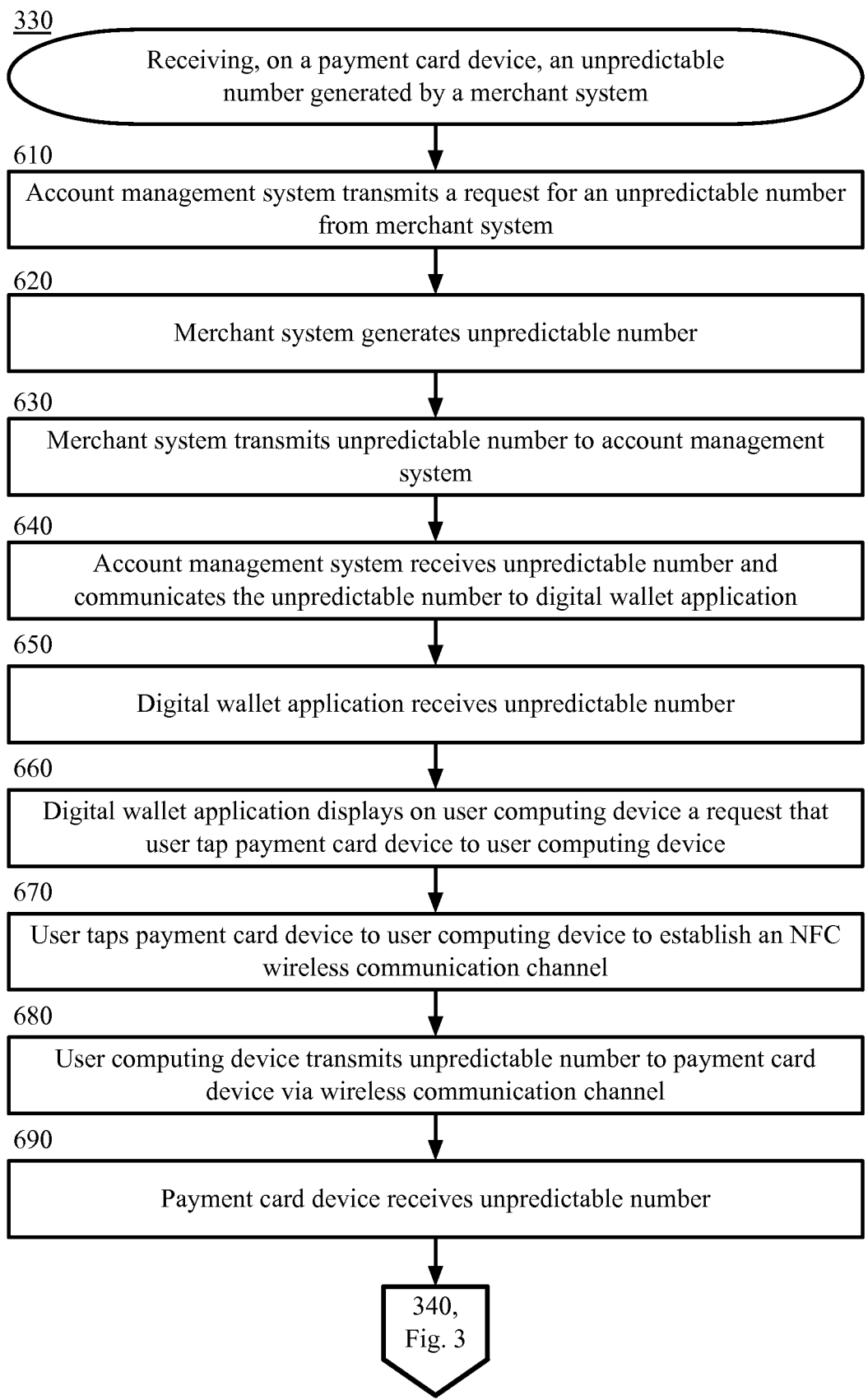
FIG. 6 is a block flow diagram receiving an unpredictable number generated by a merchant system on a payment card device, in accordance with certain example embodiments.

FIG. 6 is a block diagram depicting a method 330 for receiving, on a payment card device 120, an unpredictable number generated by a merchant system 160, in accordance with certain example embodiments. The method 330 is described with reference to the components illustrated in FIG. 1.

In block 610, the account management system 130 transmits a request for an unpredictable number to the merchant system 160. In an example embodiment, the merchant system 160 receives the request for an unpredictable number via the network 170.

In block 620, the merchant system 160 generates an unpredictable number. In an example embodiment, the merchant system 160 comprises a random number generator with which the merchant system 160 generates the unpredictable number. In an example embodiment, the merchant system 160 generates a data item. For example, the data item may comprise a random number or an unpredictable number. In this example embodiment, the data item may be any suitable data item that can be used by the payment card device 120 and/or issuer system 150, along with the shared secret, to create a cryptographic checksum. In the example embodiments described herein, functions performed using the unpredictable number may also be performed using the data item generated by the merchant system 160.

In block 630, the merchant system 160 transmits the unpredictable number to the account management system 130. For example, the merchant system 160 transmits the unpredictable over the network 170 to the account management system 130.

In block 640, the account management system 130 receives the unpredictable number and communicates the unpredictable number to the digital wallet application 115. In the example embodiments described herein, the digital wallet application 115 operating on the user computing device 110 communicates with the account management system 130 via the network 170. In an example embodiment, the account management system 130 communicates the unpredictable number to the digital wallet application 115 resident on the user computing device 110 over the network 170. In other example embodiments, the account management system 130 does not communicate the unpredictable number to the digital wallet application 115, but otherwise communicates the unpredictable number to the user computing device 110 so that the user computing device 110 may communicate the unpredictable number to the payment card device 110 via a wireless communication channel.

In block 650, the digital wallet application receives the unpredictable number. For example, the digital wallet application 115 operating on the user computing device 110 receives the unpredictable number from the payment processing system 130 via the network 170. In other example embodiments, the user computing device 110 otherwise receives the unpredictable number from the payment processing system 130 via the network 170.

In block 660, the digital wallet application displays on the user computing device 110 a request that the user 101 tap the payment card device 120 to the user computing device 110. For example, the digital wallet application 115 may display an instruction on the user interface 116 that reads "please tap the payment card you selected for use in this transaction." In another example, the user computing device 110 displays an instruction that reads "please tap a payment card for use in this transaction." In an example, the digital wallet application 115 and/or the user computing device 110 may display more detailed instructions that would enable a user 101 to understand how to tap a payment card to the user computing device 110.

In an example embodiment, in response to receiving the unpredictable number from the merchant system 160 via the payment processing system 130, the digital wallet application 115 activates a reader mode on the user computing device 110. In an example embodiment, the reader mode comprises configuring the user computing device 110 to be able to request, read, and/or receive payment account information from a payment card device 120. In an example embodiment, the digital wallet application 115 disables conflicting modes on the user computing device 110. In an example embodiment, the user computing device 110 is configured to share information with other devices when an NFC wireless communication channel is established between the user computing device 110 and the other devices. In another example embodiment, the user computing device 110 is configured to share information with other devices when a Bluetooth wireless communication channel or Wi-Fi wireless communication channel is established between the user computing device 110 and the other devices.

In an example embodiment, the user computing device 110 is able to receive and transmit information to the payment card device 120. However, in order to securely receive payment account information to process the payment transaction, this communication mode must be disabled to enable a "reader-only" communication mode. For example, automatic identification beaming may be configured on the user computing device 110 to share information with other reader mode devices in NFC proximity. This automatic identification beaming interferes with retrieving payment account information via the NFC wireless communication channel. Therefore, the automatic identification beaming functionality must be disabled when the user computing device 110 is configured to read payment account information via the NFC wireless communication channel. In example embodiment, the digital wallet application 115 disables conflicting modes on the user computing device 110 in response to the activation of the reader mode. In another example embodiment, a conflicting mode enabling communication with other devices over a network 170 interferes with the ability of the user computing device 110 to establish the NFC wireless communication channel. For example, a user computing device 110 such as a mobile phone may be prevented from establishing or maintaining an NFC wireless communication channel with a payment card device 120 if it receives or sends information to other devices over a cellular network 170.

In block 670, the user 101 taps the payment card device 120 to the user computing device 110 to establish an NFC wireless communication channel. In an example embodiment, the user 101 arranges the physical locations and/or physical orientations of the payment card device 120 and/or the user computing device 110 so that the payment card device 120 and the user computing device 110 are within a threshold proximity necessary to establish and maintain an NFC communication channel. In an example embodiment, the required proximity distance between the devices (including devices 110 and 120) is defined by the type of RF wireless communication channel established. For example, NFC communication distances generally range from about three to about four inches. In an example embodiment, the user 101 "taps" the NFC-enable payment card device 120 in the RF field of the user computing device 110 by moving the payment card device 120 within the predefined proximity of the user computing device 110. In an example embodiment, the predefined proximity is based at least in part on the strength of the generated RF field and/or the type of wireless communication used by the devices (including devices 110 and 120).

In an example embodiment, an NFC communication channel is established between the payment card device 120 and the user computing device 110 as a result of the user 101 tapping the payment card device 120 to the user computing device 110. In an example embodiment, the user computing device 110 detects the presence of the payment card device 120. In an example embodiment, the user computing device 110 detects when the payment card device 120 is moved into the RF field and/or moved within the predefined proximity of the user computing device 110. In another example embodiment, the payment card device 120 detects the user computing device 110. In an example embodiment, the detection of the physical proximity of the payment card device 120 ensures that the user computing device 110 is communicating with only one payment card device 120. In another example embodiment, the detection of the physical proximity of the payment card device 120 ensures that the payment card device 120 is physically present within the RF field generated by the user computing device 110.

In an example embodiment, the payment card device application 125 is activated by the RF field generated by the user computing device 110. In an example embodiment, the payment card device application 125 is activated when the payment card device 120 detects the RF field generated by the antenna 111 of the user computing device 110. In an example embodiment, an NFC-enabled tag or component of the payment card device 120 is activated and/or energized by the RF field generated by the user computing device 110.

In an example embodiment, user computing device 110 requests a secure communication channel with the payment card device 120. In an example embodiment, the user computing device digital wallet application 115 and the payment card device application 125 establish any number of protocols to enable a secure communication, including but not limited to NFC protocols. In an example embodiment, the user computing device 110 and the payment card device 120 exchange a key to set up a secure wireless communication channel.

In an example embodiment, the payment card device 120 receives the secure communication channel request. In another example embodiment, the user computing device 110 receives the communication channel network request from the payment card device 120. In an example embodiment, the payment card device 120 accepts the secure communication channel request. In another example embodiment, the user computing device 110 accepts the secure communication channel request. In an example embodiment, during this process, the payment card device 120 and the user computing device 110 establish a secure communication relationship by creating an encryption key for use in encrypting communications between the devices (including devices 110 and 120). In an example embodiment, the payment card device 120 does not accept the secure communication channel request from user computing devices 110 if the user computing device 110 does not have a required certificate within its secure element 114. For example, a payment card device 120 only accepts secure communication channel requests from a requesting digital wallet application 115 on a user computing device 110 that has a certificate from the financial institution associated with the payment card device 120. In another example embodiment, the payment card device 120 determines whether to accept the secure communication channel request by determining whether the user computing device 110 and/or the digital wallet application 115 has access to proper public keys or tokens. In yet another example embodiment, the user computing device 110 makes this determination.

In block 680, the user computing device 110 transmits the unpredictable number to the payment card device 120 via the wireless communication channel. In an example embodiment, the original NFC wireless communication channel established before the user computing device 110 receives payment card information is maintained between the user computing device 110 and the payment card device 120.

In block 690, the payment card device 120 receives the unpredictable number. In an example embodiment, the payment card device application 125 stores the unpredictable number on the secure element 124 and/or the data storage unit 123 on the payment card device 120.

From block 690, the method 330 proceeds to block 340 in FIG. 3.

Returning to FIG. 3, in block 340, the payment card device application 125 calculates a cryptographic checksum using the shared secret and the unpredictable number. In an example embodiment, the payment card device application 125 comprises an algorithm that is utilized to calculate the cryptographic checksum using the shared secret and the unpredictable number. In this example embodiment, the issuer system 150 configures the application 125 or causes the application 125 to be configured to calculate a cryptographic checksum in response to receiving an unpredictable number generated by a merchant system 150.

In an example embodiment, the application 125 uses a mathematical algorithm to calculate the cryptographic checksum based on the shared secret and the unpredictable number. In another example embodiment, the application 125 rearranges, combines, and/or transforms elements of the unpredictable number and shared secret to produce the cryptographic checksum. In yet another example embodiment, the shared secret comprises a mathematical function and the cryptographic checksum comprises an output of the function when the unpredictable number is the input of the function. In an example embodiment, the application 125 uses a cryptographic algorithm, such as a triple data encryption standard algorithm ("3DES"), to compute the checksum based on the shared secret and unpredictable number. In an example embodiment, the shared secret comprises an encryption key used to encrypt data.

In block 350, the issuer system 150 verifies the cryptographic checksum received in a payment authorization request from the merchant system 160. The method for verifying a payment card device 120 via a cryptographic checksum is described in more detail hereinafter with reference to the method 350 described in FIG. 7.

Figure 7:
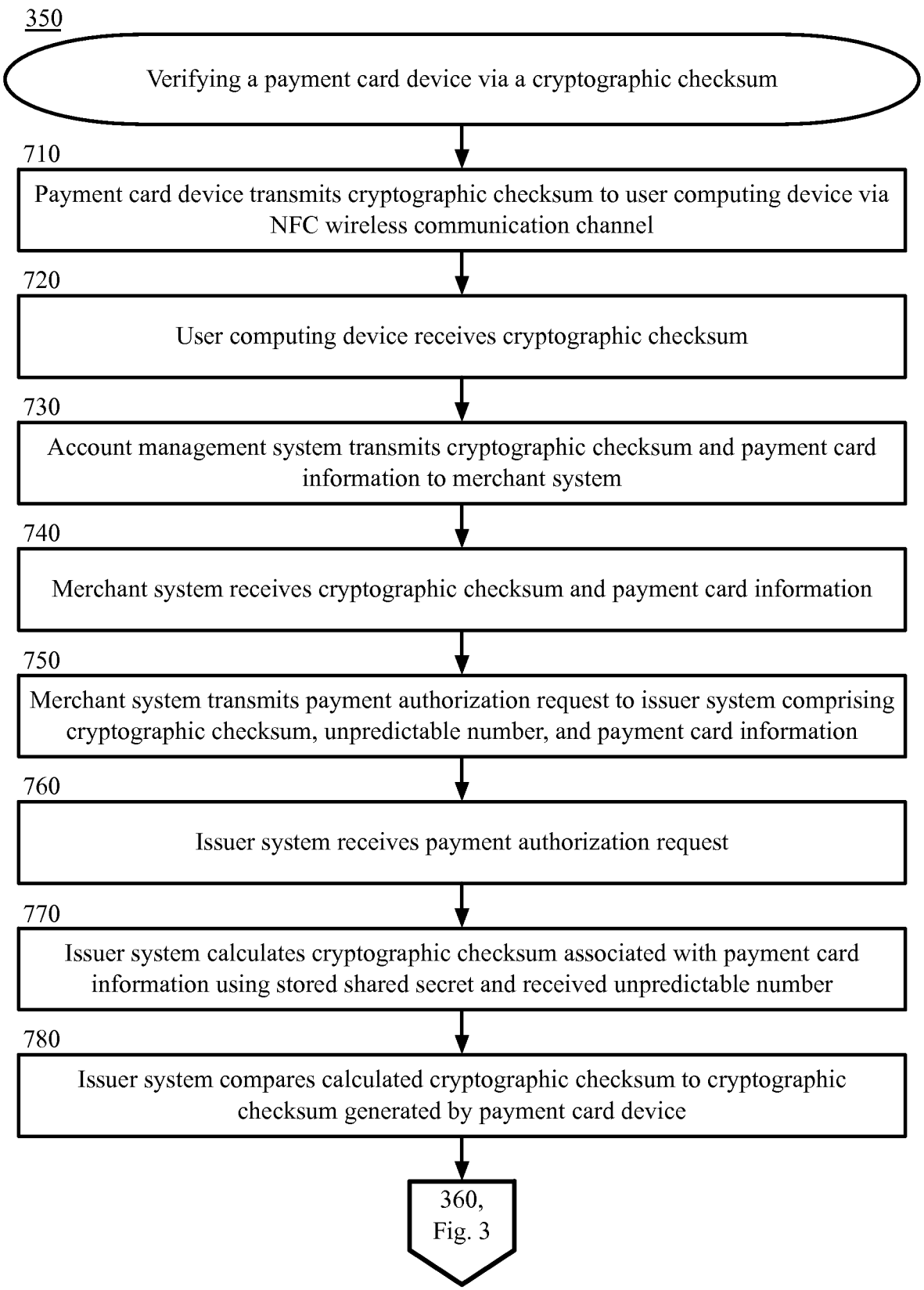
FIG. 7 is a block flow diagram depicting a method for verifying a payment card device via a cryptographic checksum, in accordance with certain example embodiments.

FIG. 7 is a block diagram depicting a method 350 for verifying a payment card device 120 via a cryptographic checksum, in accordance with certain example embodiments. The method 350 is described with reference to the components illustrated in FIG. 1.

In block 710, the payment card device 120 transmits the cryptographic checksum to the user computing device 110 via the NFC wireless communication channel.

In block 720, the user computing device 110 receives the cryptographic checksum. For example, the user computing device 110 receives the cryptographic checksum via the NFC wireless communication channel. In an example embodiment, the user computing device 110 communicates the cryptographic checksum to the account management system 130 via the network 170.

In block 730, the account management system 130 transmits the cryptographic checksum and payment card information to the merchant system 160. In an example embodiment, the account management system 130 retrieves the payment card information associated with the payment card device 120 that the user 101 uploaded into the digital wallet account at a previous time. In another example embodiment, the account management system 130 receives payment card information transmitted from the payment card device 120 to the user computing device 110 along with the cryptographic checksum. In an example embodiment, the account management system 130 transmits the cryptographic checksum and payment card information to the merchant system 160 via the network 170.

In block 740, the merchant system 160 receives the cryptographic checksum and the payment card information. For example, the merchant system 160 receives the cryptographic checksum and the payment card information from the account management system 130 via the network 170.

In block 750, the merchant system 160 transmits a payment authorization request to the issuer system 150 comprising the cryptographic checksum, the unpredictable number, and payment card information. In an example embodiment, in addition to comprising the cryptographic checksum, the unpredictable number, and the payment card information the transaction authorization request further comprises the total currency amount of the transaction, an account number of the merchant system, and any other relevant information for the transaction. In an example embodiment, the merchant system 160 first generates the payment authorization request before transmitting the payment authorization request to the issuer system 150.

In certain other example embodiments, the merchant system 160 transmits a payment authorization request generated by the account management system 130. For example, the account management system 130 received the total amount, the merchant system 160 account number, and other relevant information from the merchant system website 167 or merchant system 160 when the user 101 initiated the transaction. In this example, the account management system 130 generates a payment authorization request comprising the cryptographic checksum, the unpredictable number, and the payment card information. Additionally, the payment authorization request may further comprise the total transaction amount and a merchant system 160 account number. In this example embodiment, the account management system 130 transmits the generated payment authorization request to the merchant system 160 over the network 170 and the merchant system 160 forwards the payment authorization request to the issuer system 150.

In block 760, the issuer system 150 receives the payment authorization request. For example, the issuer system 150 receives the payment authorization request from the merchant system 160 via the network 170. In an example embodiment, the issuer system 150 extracts the cryptographic checksum, the unpredictable number, and the payment card information from the received payment authorization request. In an example embodiment, the issuer system 150 retrieves the shared secret associated with the payment card information. In an example embodiment, the issuer system 150 accesses a database wherein shared secrets are associated with corresponding payment card information and other relevant information for user 101 financial accounts with the issuer system 150.

In block 770, the issuer system 150 calculates a cryptographic checksum associated with the payment information using a stored shared secret and the received unpredictable number. In an example embodiment, the issuer system 150 calculates the cryptographic checksum in the same manner as the payment card device 120 calculated the cryptographic checksum as described in block 340 of FIG. 3. For example, the issuer system 150 uses a mathematical algorithm to calculate the cryptographic checksum based on the shared secret and the unpredictable number. In another example embodiment, the issuer system 150 rearranges, combines, and/or transforms elements of the unpredictable number and shared secret to produce the cryptographic checksum. In yet another example embodiment, the shared secret comprises a mathematical function and the cryptographic checksum comprises an output of the function when the unpredictable number is the input of the function. For example, the shared secret comprises a cryptographic algorithm, such as a triple data encryption standard algorithm ("3DES"), to compute the checksum.

In block 780, the issuer system 150 compares the calculated cryptographic checksum to the cryptographic checksum generated by the payment card device 120. In an example embodiment, the issuer system 150 compares each number, symbol, letter, and/or character of the two cryptographic checksums to determine the similarity between the two cryptographic checksums.

From block 780, the method 350 proceeds to block 360 in FIG. 3.

Returning to FIG. 3, in block 360, the issuer system 150 determines if the calculated cryptographic checksum matches the received cryptographic checksum. In an example embodiment, a match comprises an exact match between the two cryptographic checksums. In another example embodiment, a match comprises an exact match of at least a part or component of the two cryptographic checksums. For example, the issuer system 150 compares each number, symbol, letter, and/or character of the two cryptographic checksums to determine the similarity between the two cryptographic checksums.

If the cryptographic checksum calculated by the issuer system 150 does not match the received cryptographic checksum, the method 300 proceeds to block 370. For example, one or more of each number, symbol, letter, and/or character of the checksum calculated by the issuer system 150 does not match the corresponding number, symbol, letter, and/or character of the received cryptographic checksum.

In block 370, the issuer system 150 denies the payment authorization request and transmits a notice of declined payment authorization to the merchant system 160. In another example embodiment, the issuer system 150 transmits a notice of denial of payment authorization request to the account management system 130 over the network 170. In another example embodiment, the issuer system 150 transmits the notice of denial of payment authorization request to the user computing device 110 over the network 170. In an example embodiment, the issuer system 150, even if the two cryptographic checksums match, may deny the transaction authorization request based on the user's 101 account balance or credit balance associated with the payment card device 120 or a transaction history associated with the payment card device 120. For example, the issuer system 150 may deny the transaction authorization request if the user 101 has exceeded an allowed credit balance even if the token is valid and the received user computing device 110 identifier matches the user computing device 110 identifier associated with the token.

In block 390, the merchant system 160 transmits a receipt to the user computing device 110. In an example embodiment, in response to receiving a notice of declined payment authorization from the issuer system 150, the merchant system 160 transmits a receipt comprising notification that the transaction was declined to the user computing device 110 and/or the account management system 130. In an example embodiment, if the account management system 130 receives the receipt from the merchant system 160, the account management system 130 instructs the digital wallet application 115 to display the receipt to the user 101 on the user computing device 110.

Returning to block 360, if the cryptographic checksum calculated by the issuer system 150 matches the received cryptographic checksum, the method 300 proceeds to block 380. For example, each number, symbol, letter, and/or character of the checksum calculated by the issuer system 150 matches the corresponding number, symbol, letter, and/or character of the received cryptographic checksum.

In block 380, the issuer system 150 approves the payment authorization request and transmits a notice of approved payment authorization to the merchant system 160. In an example embodiment, the issuer system 150 may approve the transaction authorization request further based on the user's 101 account balance or credit balance associated with the payment card device 120 or a transaction history associated with the payment card device 120. For example, the issuer system 150 may approve the transaction authorization request only if the user 101 has not exceeded an allowed credit balance. In an example embodiment, the issuer system 150, upon approval of the transaction authorization request, charges the user's 101 financial account with the issuer system 150 and schedules a payment to the merchant system 160 account identified in the received transaction authorization request. In an example embodiment, the issuer system 150 bills the user 101 for the transaction amount and the user 101 makes a payment to the issuer system 150 at a later time to satisfy the transaction amount balance on the user's 101 financial account. For example, the user 101 receives a statement for a credit account associated with the issuer system 150 for the payment card device 120 associated with the token that the user 101 used in the transaction.

In block 390, the merchant system 160 transmits a receipt to the user computing device 110. In an example embodiment, in response to receiving a notice of approved payment authorization from the issuer system 150, the merchant system 160 transmits a receipt comprising notification that the transaction was successful to the user computing device 110 and/or the account management system 130. In an example embodiment, if the account management system 130 receives the receipt from the merchant system 160, the account management system 130 instructs the digital wallet application 115 to display the receipt to the user 101 on the user computing device 110.

In certain example embodiments, the account management system 130 maintains a transaction history for the user 101 on the user's digital wallet account and the account management system 130 updates the user's 101 transaction history upon receiving the notice of approval of the transaction authorization request. In an example embodiment, the account management system 130 notifies the merchant system website 167 that the transaction was successful. In an example embodiment, the merchant system website 167 notifies the user 101 via email, text message, or other means that the transaction was successful and provides relevant transaction details. In another example embodiment, the merchant system website 167 notifies the user 101 that the transaction was successful and provides relevant transaction details via email, via text message, or via other means.

In an example embodiment, the account management system transmits the receipt to the digital wallet application 115 or via email or text message to the user computing device 110. In an example embodiment, in which the issuer system 150 approved the transaction authorization request, the receipt comprises a summary of the transaction or a notice to check the user's 101 transaction history in the user's 101 digital wallet account for a summary of the transaction. For example, the user 101 receives a notification on the digital wallet application 115 to check the user's 101 transaction history. In other example embodiments, in which the issuer system 150 denied the transaction authorization request, the receipt comprises notification to the user 101 that the transaction was unsuccessful.

In certain example embodiments wherein the user 101 transacts with the merchant system website 167, the user computing device 110 web browser 117 may be re-directed to the merchant website 167 after a transaction authorization request is approved or denied. For example, the merchant website 167 may display its own receipt on the merchant system website 167. For example, the receipt may comprise a summary of the user's 101 order and shipping information.

Other Example Embodiments

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to verify user possession of payment card devices associated with payment information used in online transactions, comprising:

transmitting, by a user computing device and to an online merchant system, an unpredictable number request in response to receiving an input initiating an online transaction with the online merchant system;

receiving, by the user computing device and from the online merchant system, an unpredictable number generated by the online merchant system;

in response to receiving the unpredictable number from the online merchant system, displaying, by the user computing device, a request to initiate a tap with the user computing device;

detecting, by the user computing device, the tap of a payment card device to the user computing device;

in response to detecting the tap, establishing, by the user computing device and with the payment card device, a wireless communication channel;

transmitting, by the user computing device and to the payment card device via the wireless communication channel, the unpredictable number;

accessing, by an application on the payment card device, a first shared secret stored on a secure memory of the payment card device;

calculating, by the application on the payment card device, a first check sum based on the unpredictable number and the first shared secret stored on the secure memory of the payment card device;

receiving, by the user computing device and from the payment card device, the check sum and payment account information stored on the payment card device;

transmitting, by the user computing device and to the online merchant system, the check sum and the payment account information;

transmitting, by the online merchant system, a payment authorization request comprising the check sum, the unpredictable number, and the payment account information to an issuer system associated with the payment account information;

calculating, by the issuer system, a second check sum based on the received unpredictable number and a second shared secret stored by the issuer system and associated with the payment card device; and approving, by the issuer system, the payment authorization request if the first and second check sums match.

2. The method of claim 1, wherein the user computing device transmits the unpredictable number request, receives the unpredictable number, and transmits the check sum and the payment account information to the online merchant system via a merchant system application operating on the user computing device.

3. The method of claim 1, wherein the user computing device transmits the unpredictable number request, receives the unpredictable number, and transmits the check sum and the payment account information to the online merchant system via one or more computing devices of an account management system associated with a digital wallet account of the user.

4. The method of claim 1, wherein the user computing device communicates with the payment card device via near field communication, communication via ultra high frequency radio waves, or Wi-Fi communication protocols.

5. The method of claim 1, further comprising:
approving, by the issuer system, the payment authorization request;
transmitting, by the issuer system, a notification of approval of the payment authorization request to the online merchant system;

receiving, by the user computing device and from the online merchant system, a receipt comprising a notification of an approved payment transaction; and displaying, by the user computing device, the receipt to the user.

6. The method of claim 1, further comprising generating, by the issuer system at a time before the user initiates the transaction with the online merchant system, the payment card device comprising the first shared secret, wherein the first shared secret is identical to the second shared secret stored by the issuer system and associated with the payment card device.

7. A system to verify user possession of payment card devices associated with payment information used in online transactions, comprising:

a user computing device;

a payment card device; and an issuer system computing device, the user computing device comprising a storage device and a processor communicatively coupled to the storage device, wherein the processor executes application code instructions that are stored in the storage device to cause the user computing device to:
transmit, to an online merchant system, an unpredictable number request in response to receiving an input initiating an online transaction with the online merchant system;
receive, from the online merchant system, an unpredictable number generated by the online merchant system;
in response to receiving the unpredictable number from the online merchant system, display a request to initiate a tap with the user computing device;
detect the tap of the payment card device to the user computing device;
in response to detecting the tap, establish, with the payment card device, a wireless communication channel;
transmit, to the payment card device via the wireless communication channel, the unpredictable number;
receive, from the payment card device, a check sum and payment account information stored on the payment card device; and
transmit, to the online merchant system, the check sum and the payment account information along with a request to transmit a payment authorization request comprising the check sum, the unpredictable number, and the payment account information to the issuer system associated with the payment account information;

the payment card device comprising a second storage device, a secure element, and a second processor communicatively coupled to the second storage device and the secure element, wherein the second processor executes application code instructions that are stored in the second storage device to cause the payment card device to:
receive the unpredictable number from the user computing device via the wireless communication channel;
access, using an application on the payment card device, a first shared secret stored on the secure element;
calculate, using the application on the payment card device, the first check sum based on the unpredictable number and the first shared secret stored on the secure element; and
transmit the first check sum to the user computing device via the wireless communication channel; and the issuer system computing device comprising a third storage device and a third processor communicatively coupled to the third storage device, wherein the third processor executes application code instructions that are stored in the third storage device to cause the issuer system computing device to:
receive a payment authorization request and the unpredictable number and the first checksum from the online merchant system;
calculate a second check sum based on the received unpredictable number and a second shared secret stored on the third storage device; and
approve the payment authorization request if the first and second check sums match.

8. The system of claim 7, wherein the unpredictable number request is transmitted, the unpredictable number is received, and the check sum and the payment account information are communicated to the online merchant system via one or more computing devices of an account management system associated with a digital wallet account of the user.

9. The system of claim 7, wherein communication with the payment card device is via near field communication, communication via ultra high frequency radio waves, or Wi-Fi communication protocols.

10. The system of claim 7, further comprising:
approving, by the issuer system, the payment authorization request;
transmitting, by the issuer system, a notification of approval of the payment authorization request to the online merchant system;
receiving, by the user computing device, from the online merchant system, a receipt comprising a notification of an approved payment transaction;
displaying, by the user computing device, the receipt.

11. The system of claim 7, wherein, at a time before the user initiates the transaction with the online merchant system, the issuer system generates the payment card device comprising the first shared secret, wherein the first shared secret is identical to the second shared secret stored by the issuer system and associated with the payment card device.

* * * * *